United States Patent [19]

Commins

[11] Patent Number: 5,297,890
[45] Date of Patent: Mar. 29, 1994

[54] WOOD-TO-PIPE CONNECTION

[75] Inventor: Alfred D. Commins, Danville, Calif.

[73] Assignee: Simpson Strong-Tie Company, Inc., San Leandro, Calif.

[21] Appl. No.: 104,426

[22] Filed: Aug. 9, 1993

Related U.S. Application Data

[63] Continuation of Ser. No. 839,127, Feb. 20, 1992, abandoned.

[51] Int. Cl.⁵ .................................. F16B 2/06
[52] U.S. Cl. .................................. 403/398; 403/191; 403/233; 403/384; 256/69; 248/74.1
[58] Field of Search ............... 403/398, 399, 392, 386, 403/191, 199, 400, 233–234, 232.1; 256/68, 65, 69, DIG. 4, DIG. 5; 248/73, 65, 74.1

[56] References Cited

U.S. PATENT DOCUMENTS

| | | | |
|---|---|---|---|
| 1,341,113 | 5/1920 | Dottl et al. | 248/74.1 |
| 1,943,766 | 1/1934 | MacDonald | 189/33 |
| 2,835,002 | 5/1958 | Majewski | 20/92 |
| 3,227,406 | 1/1966 | Shelton | 248/54 |
| 4,007,993 | 2/1977 | Schwartz | 403/191 X |
| 4,471,947 | 9/1984 | Osborne | 256/65 X |
| 4,526,348 | 7/1985 | Cammack | 256/65 |
| 4,899,991 | 2/1990 | Brunkan | 256/55 X |

FOREIGN PATENT DOCUMENTS

| | | | |
|---|---|---|---|
| 283666 | 12/1966 | Australia | 248/74.1 |
| 300769 | 11/1928 | United Kingdom | 248/74.1 |
| 414755 | 8/1934 | United Kingdom | 248/74.1 |

Primary Examiner—Randolph A. Reese
Assistant Examiner—Harry C. Kim
Attorney, Agent, or Firm—James R. Cypher

[57] ABSTRACT

A wood-to-pipe connection in which a single sheet metal connector and a single threaded straight bolt are used to connect a wood frame member to an elongated pipe member. The elongated pipe member could be a metal conduit, standard pipe member or even a solid circular wood pole member. The wood-to-pipe connection is especially useful in attaching wood fencing to metal pipe used for fence posts. The sheet metal connector may be field bent by hand so that the same sheet metal connector may be used in connecting fence rails at mid-rail connections, butt joints, outside corners, inside corners and sloping fences.

2 Claims, 3 Drawing Sheets

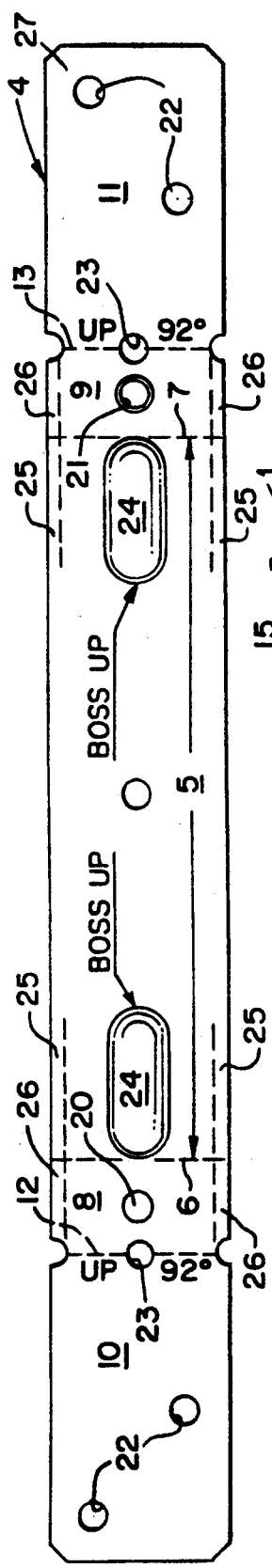
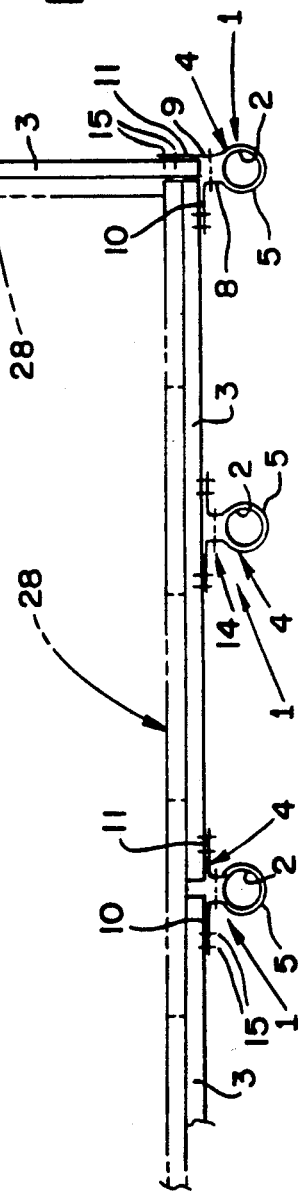

WOOD-TO-PIPE CONNECTION

This is a continuation of copending application(s) Ser. No. 07/839,127 filed on Feb. 20, 1992, now abandoned.

BACKGROUND OF THE INVENTION

This disclosure relates to a sheet metal connector for making a wood-to-pipe connection. A primary use of the present invention is in the connection of wood fence members to a metal post member. Another use is to connect pipe rails to wood fence posts.

Prior art patents do not disclose a simple and easy to install wood-to-pipe connection and no patents were found specifically used for attaching wood fencing members to metal posts.

Several unpatented wood-to-pipe connections used in constructing fencing are presently in use, but none are as simple to manufacture and easy to install as the presently disclosed invention.

None of the patented or commercially available connectors, e.g. form a threaded opening in the sheet metal part itself thereby eliminating the need for a separate nut which is easily misplaced or lost in the construction process. Further, none of the devices disclose a connector which consists of a single sheet metal member and a single straight bolt member.

SUMMARY OF THE INVENTION

The gist of the present invention is the use of a single sheet metal member formed with a threaded opening, and a single straight bolt member formed with a threaded distal end for threadable engagement with the threaded opening which is used in connecting a wood frame member to a metal pipe member.

An object of the present invention is to provide a wood-to-pipe connection which is easily and inexpensively manufactured, easy to install, provides a strong reliable connection and is aesthetically pleasing when used in architectural uses.

A further object is to provide a sheet metal connector which can be used in constructing fencing so that a single sheet metal connector that is field bent by hand accommodates fence rails at mid-rail connections, butt joints, outside corners, inside corners and sloping fences.

BRIEF DESCRIPTION OF THE DRAWINGS

FIG. 7 is a top view schematic of a portion of a fence system illustrating the installation of several wood-to-pipe pipe connections of the present invention.

FIG. 8 is a plan view of a sheet metal blank from which the sheet metal connector of the present invention is constructed.

DESCRIPTION OF THE PREFERRED EMBODIMENT

Figure 1:
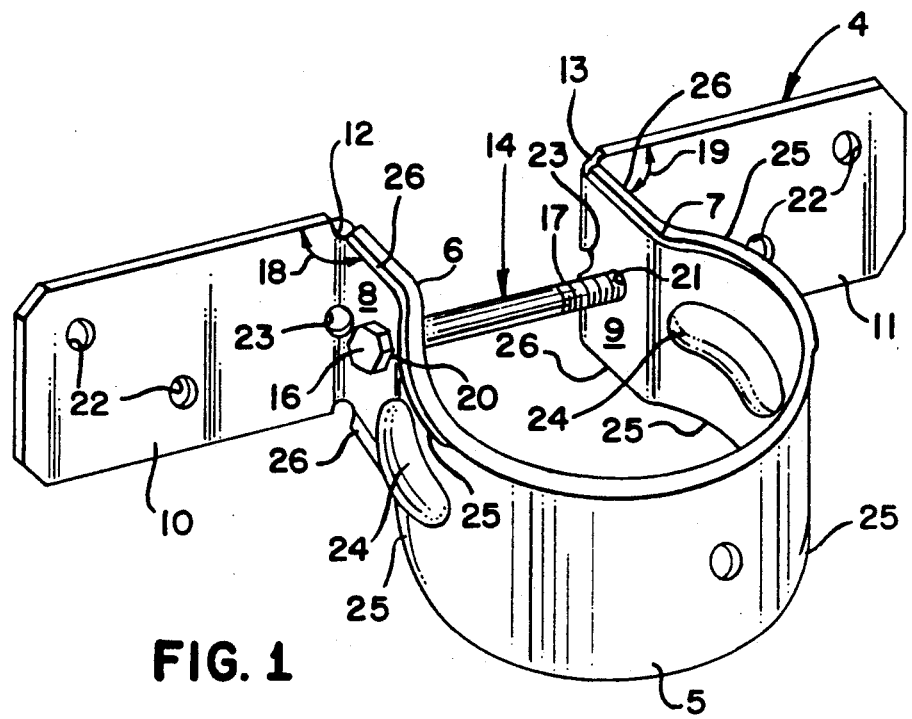
FIG. 1 is a perspective view of the sheet metal connector of the present invention.
Figure 2:
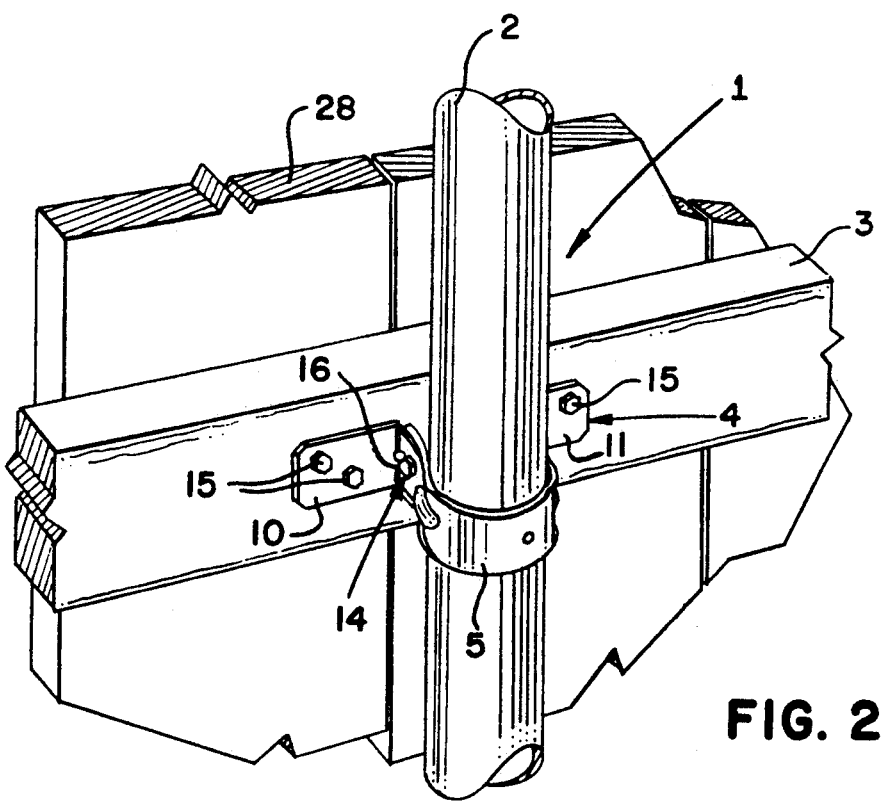
FIG. 2 is a perspective view of the wood-to-pipe connection of the present invention illustrating a typical installation of the sheet metal connector shown in FIG. 1.
Figure 3:
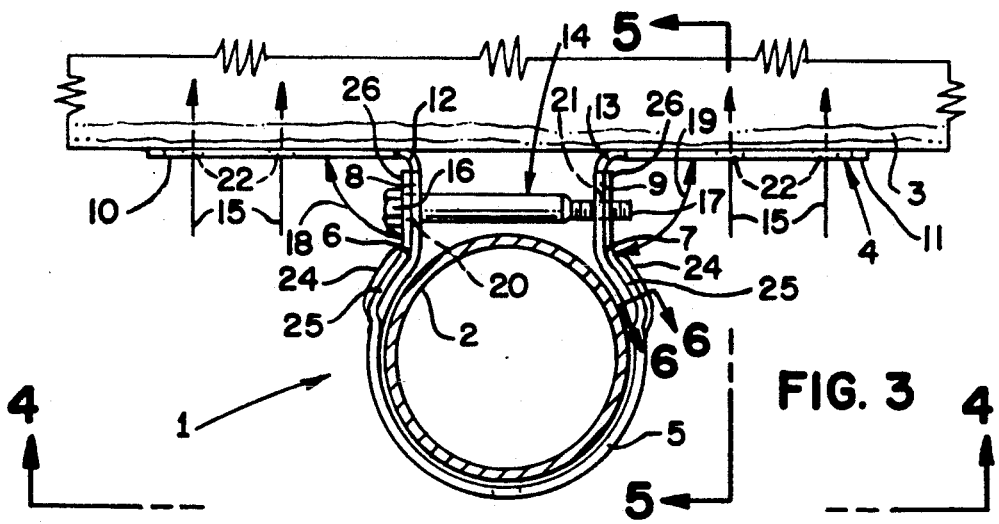
FIG. 3 is a top plan view of a portion of the wood-to-pipe connection illustrated in FIG. 2 with the pipe in cross section.
Figure 4:
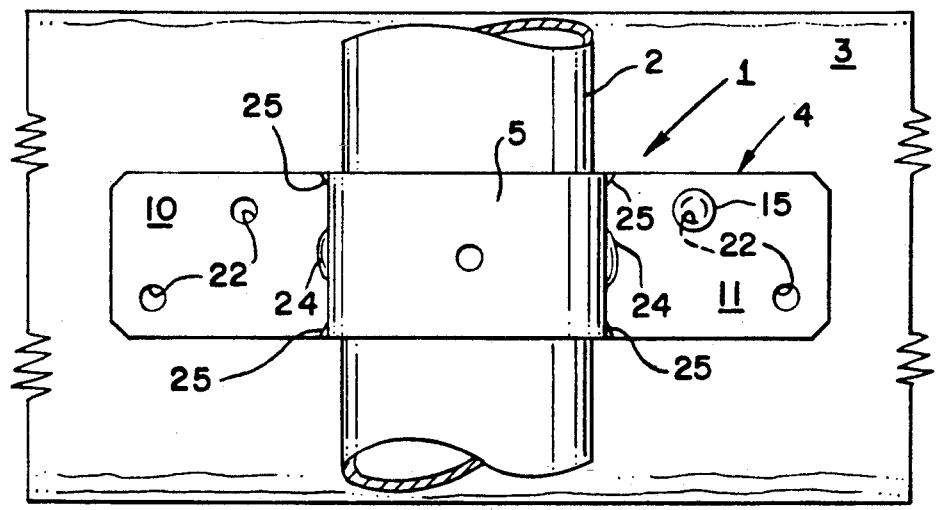
FIG. 4 is a side view of the wood-to-pipe connection illustrated in FIG. 3 taken in the direction of arrows 4—4.
Figures 5, 6:
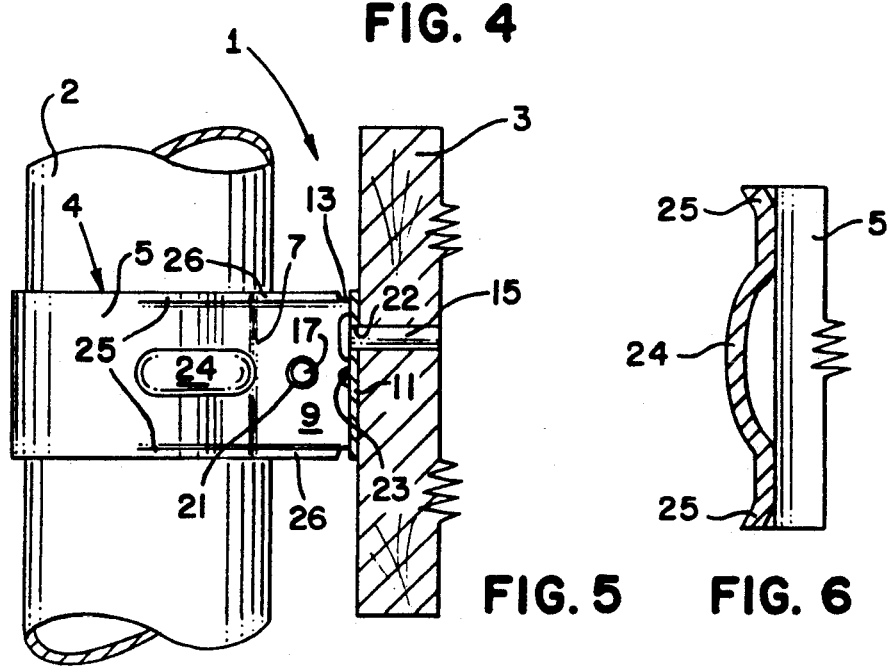
FIG. 5 is a side view of the wood-to-pipe connection illustrated in FIG. 3 taken in the direction of arrows 5—5.
FIG. 6 is a partial cross sectional view taken along lines 6—6 in FIG. 3.

The present invention is a wood-to-pipe connection 1 comprising: an elongated pipe member 2; a wood frame member 3 disposed in close association to the elongated pipe member 2; a sheet metal connector 4 for attaching the wood frame member 3 and the elongated pipe member 2 which includes: a curvilinear portion 5 dimensioned for registering with and partially encircling the elongated pipe member 2 and having ends 6 and 7 spaced one from the other; first and second lug members 8 and 9, each integrally and respectively connected to the spaced ends 6 and 7 of the curvilinear member 5; foot members 10 and 11 respectively integrally connected to the first and second lug members 8 and 9 along bend lines 12 and 13; and cinching means 14 releasably attached to the first and second lug members 8 and 9 for drawing the lug members toward one another thereby decreasing the radius dimension of the curvilinear portion 5 and causing the curvilinear portion to frictionally engage the elongated pipe member 2; and fastener means 15 attaching the foot members 10 and 11 to the wood frame member 3.

Preferably, in the wood-to-pipe connection 1, the cinching means 14 is a bolt with a head 16 having a threaded distal end 17.

In the preferred form illustrated of the wood-to-pipe connection 1, the foot members 10 and 11 are prebent along bend lines 12 and 13 at angles 18 and 19 to the lug members 8 and 9; and the material at the bend lines 12 and 13 is selected to permit hand field bending of the foot members 10 and 11 with respect to the lug members 8 and 9.

Also, in the preferred form of the wood-to-pipe connection 1, the first lug member 8 is formed with an opening 20 dimensioned to receive the threaded bolt 14 therethrough and to prevent the head end 16 from passing therethrough and the second lug member 9 is formed with a threaded opening 21 dimensioned to threadably receive and engage the threaded distal end 17.

To assist in the installation of sheet metal connector 4, the foot members 10 and 11 are formed with openings 22 for receiving the fastener means 15 therethrough.

To facilitate hand field bending of foot members 10 and 11, bend lines 12 and 13 may be formed with a weakened cross section either by reducing the material at this point, scoring the bend lines or factory forming openings 23 along the bend lines 12 and 13.

In order to maintain first and second lug members 8 and 9 generally parallel while cinching means 14 is being tightened, indentations 24 may be formed in curvilinear portion 5 adjacent first and second lug members 8 and 9, and edge flanges 25 may be formed on both edges of the curvilinear portion 5 adjacent first and second lug members 8 and 9. Even more stiffening may be obtained by continuing edge flanges 25 into edge flanges 26 on both sides of first and second lug members 8 and 9.

In the preferred form, the sheet metal connector 4 is formed from a sheet metal blank 27.

In a typical installation, elongated pipe member 2 is set into a concrete foundation in a generally vertical attitude. The sheet metal connector 4 with threaded bolt 14 is either slipped over the elongated wood pipe member 2 or threaded bolt 14 is removed and sheet metal connector 4 is then snapped around elongated wood pipe member 2 and held in the selected position. Wood frame member 3 is then placed against at least one foot member 10 or 11 and either temporarily or permanently affixed by one or more fasteners 15. Threaded bolt member 14 is then placed through opening 20 and threaded distal end 17 is threaded into threaded opening 21. Preferably head 16 is formed as a hex head so that threaded bolt may then be tightened with a wrench until first and second lug members 8 and 9 are brought together causing the curvilinear portion 5 to frictionally engage elongated pipe member 2.

After threaded bolt 14 is completely tightened, the other leg of sheet metal connector 4 may then be attached to wood frame member 3 by fastener means 15 which may be either nails or lag screws or other form of wood fastener.

Use of the wood-to-pipe connection in the installation of a fence is as follows: The elongated pipe members 2 are installed vertically in concrete. Slide three or four sheet metal connectors 4 over the elongated pipe member 2 (depending on the number of rails), and line the top sheet metal connector 4 up to a stringline for the top fence rail. Screw the supplied bolt 14 until the bolt shank locks into the opposite threaded hole manually or by using a screw gun. Tighten the bolt 14 until the sheet metal connector 4 attaches securely to the elongated pipe member 2. Repeat the process for the rest of the sheet metal connectors 4 and continue on to the remaining elongated pipe members 2. With two people holding the fence rail (wood frame member 3) horizontally in position, fasten the sheet metal connector to the bottom rail with a ¼ lag screw (fastener means 15), then install the other three lag screws (fastener means 15). Repeat on the middle and top sheet metal connectors 4 until all are connected to the remaining elongated pipe members 2. Nail fence boards to the rails (wood frame members 3)

At fence terminations, the elongated pipe member 2 should be positioned at least 6" back from the end of the fence.

At corners, the elongated pipe member should be offset 2¼" for a 90° corner and 1" for a 45° corner.

A major feature of the present invention is the fact that the same sheet metal connector 4 may be used to connect wood frame members such as fence rails at mid rail connections, butt joints, outside corners, inside corners and sloping fences as shown in the schematic drawing of a fence system illustrated in FIG. 7.

To accommodate all of the above conditions, it is only necessary to bend one or both of the foot members 10 and 11 along bend lines 12 and 13.

Referring to the drawings, in a mid rail connection, foot members 10 and 11 would be generally parallel to one another and at generally right angles to first and second lug members 8 and 9. At an outside corner, foot member 10 would remain at a right angle to first lug member 8 and foot member 11 would be bent so that it was generally parallel to second lug member 9. At a turn in a fence, one or both foot members 10 and 11 may be bent to accommodate the angle of the bend in the fence.

It is to be understood that the sheet metal connector 4 of the present invention is not limited to fence construction, but may be used in any type of construction in which a wood frame member 3 is to be attached to a metal pipe or conduit member.

In one form of the invention, the sheet metal connector 4 is used to attach wood fences to 2" pipe fence posts. The sheet metal connector 4 may be made from 12 gauge steel which preferably is finished with a triple zinc coating. Typically, in constructing fences, four ¼"×1½" lag screws are used for each sheet metal connector 4.

In one commercial example, the sheet metal connector 4 is constructed from a blank 12½ inches long by 1⅛ inches wide. When bent to final form, the sheet metal connector is typically 6½" long in total length with each foot member 10 and 11 2⅞" in length. The curvilinear portion typically has a diameter of 2⅜". Other common denominator sizes are 1⅞", 1⅝", and 1¼".

I claim:

1. A wood-to-pipe connection comprising:
   a. an elongated pipe member having a radius dimension;
   b. a wood frame member disposed closely adjacent to said elongated pipe member;
   c. a single piece sheet metal connector having a thickness of at least 12 gauge for attaching said wood frame member and said elongated pipe member including:
      (1) a curvilinear portion having a radius dimension substantially equal to or greater than said radius dimension of said elongated pipe member for registering with and partially encircling said elongated pipe member and having first and second ends spaced one from the other and having edges formed with stiffening flanges on portions adjacent said first and second ends and mid portion indentations formed in said curvilinear portion adjacent said first and second ends for holding first and second lug members generally planar and parallel;
      (2) said first lug member formed with an opening dimensioned to receive a headed bolt having a threaded distal end here through and to prevent said headed end from passing there through and said second lug member formed with a threaded opening dimensioned to threadably receive and engage said threaded distal end for holding said second lug member at a right angle to a second generally planar foot member, and said first and second lug members each having inner and outer ends and, each integrally and respectively connected at said inner ends to said first and second spaced ends of said curvilinear member;
      (3) a first generally planar foot member and said second generally planar foot member each having inner and outer ends respectively integrally connected at said inner ends respectively to said outer ends of said first and second lug members along first and second bend lines at substantially right angles;
      (4) said first and second lug members are formed as generally straight members extending respectively from said first and second spaced ends of said curvilinear portions to said connection with said inner ends of said first and second foot members; and said first and second lug members are each formed with side edges formed with stiffening flanges extending substantially along the entire length of both of said respective side edges and (5) said headed bolt releasably attached to said first and second lug members for drawing said lug members toward one another thereby decreasing said radius dimension of said curvilinear portion and causing said curvilinear portion to frictionally engage said elongated pipe member;

d. said foot members are each formed with at least two longitudinally and transversely spaced openings;

e. at least four fastener means inserted through said openings in said foot members and attaching said foot members to said wood frame member causing said first and second generally planar foot members to remain generally planar during installation and use of said wood-to-pipe connection;

f. tightening means for engaging and turning said headed bolt; and g. said first and second lug members have a limited length permitting only said tightening means to engage and turn said headed bolt.

2. A wood-to-pipe connection as described in claim 1 comprising:

a. said foot members are pre-bent along said bend lines at angles to said lug members; and b. said bend lines are configured to permit hand field bending of said foot members with respect to said lug members.

* * * * *